United States Patent [19]

Ettinger

[11] Patent Number: 5,242,202
[45] Date of Patent: Sep. 7, 1993

[54] PLUG-IN WHEEL GRABBER

[75] Inventor: Gary C. Ettinger, Campbell, Calif.

[73] Assignee: FMC Corporation, Chicago, Ill.

[21] Appl. No.: 815,087

[22] Filed: Dec. 27, 1991

[51] Int. Cl.⁵ .................. B66C 1/42; B60B 30/00; G01B 5/255
[52] U.S. Cl. .................. 294/93; 294/119.1; 294/902; 33/203.18; 414/426
[58] Field of Search .................. 294/93, 119.1, 902; 414/426, 429; 269/271, 275, 279, 280, 281, 283, 284; 29/273; 901/39; 33/203.18, 203, 336, 288

[56] References Cited

U.S. PATENT DOCUMENTS

| | | | |
|---|---|---|---|
| 2,254,588 | 9/1941 | Breth | 294/93 X |
| 2,390,293 | 12/1945 | Colson | 294/119.1 X |
| 3,322,456 | 5/1967 | Strakhal et al. | 294/902 X |
| 4,022,341 | 5/1977 | Lindquist | 294/93 X |
| 4,083,547 | 4/1978 | Gurley | 269/279 X |
| 4,363,475 | 12/1982 | McCarty | 269/283 X |
| 4,645,411 | 2/1987 | Madwed | 294/902 X |
| 4,815,216 | 3/1989 | Swayne | 33/288 X |
| 5,005,889 | 4/1991 | Nerger et al. | 294/119.1 X |

FOREIGN PATENT DOCUMENTS

| | | | |
|---|---|---|---|
| 3325921 | 1/1985 | Fed. Rep. of Germany | 294/119.1 |
| 276852 | 3/1990 | Fed. Rep. of Germany | 294/902 |
| 1342860 | 10/1987 | U.S.S.R. | 294/902 |

Primary Examiner—David M. Mitchell
Assistant Examiner—Dean J. Kramer
Attorney, Agent, or Firm—H. M. Stanley; R. C. Kamp; R. B. Megley

[57] ABSTRACT

A grabber for a wheel clamp of a wheel aligner has a tip including a body shaft with first and second wheel engagement ends. The body shaft includes a circumferential groove formed thereon. A barrel attached to a carrier of the wheel clamp has a bore sized to slidingly receive the body shaft. The bore has a groove formed in its wall. An elastic "O" ring is fitted within the body shaft groove and, when an engagement end of the shaft is inserted in the bore, the "O" ring resiliently retains the shaft within the bore. Alternatively the grabber tip includes first and second cross shafts, each with first and second wheel engagement ends. The first and second cross shafts and body shaft have axes which are mutually perpendicular.

13 Claims, 5 Drawing Sheets

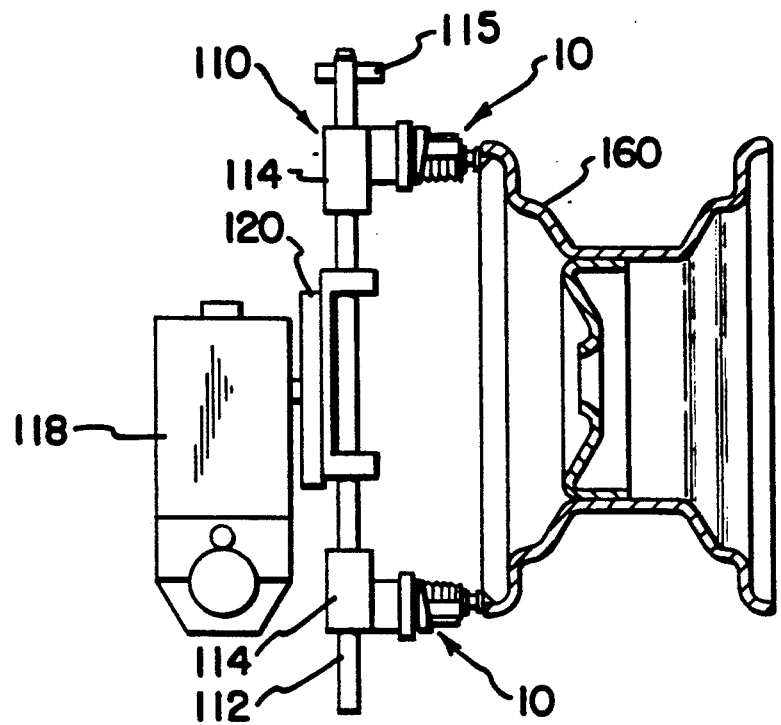
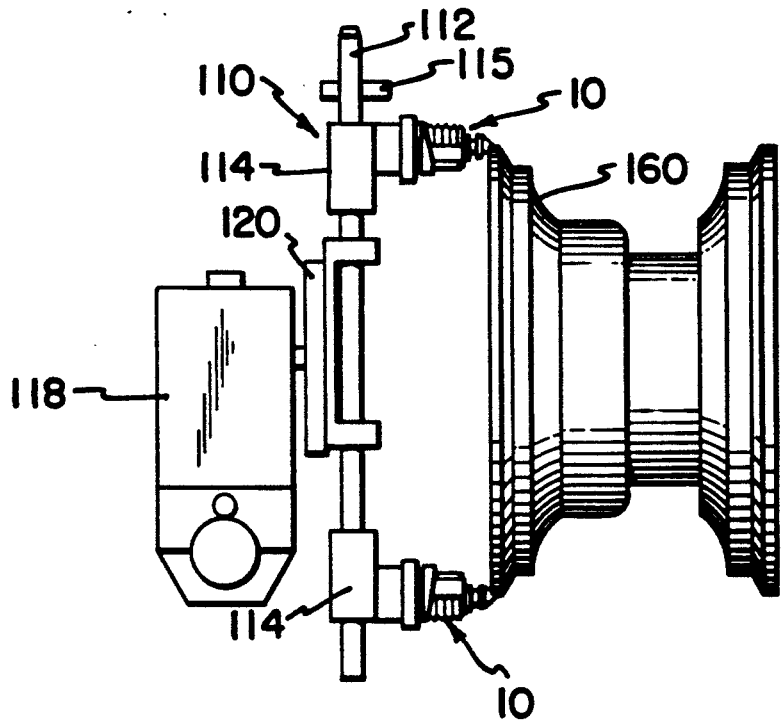

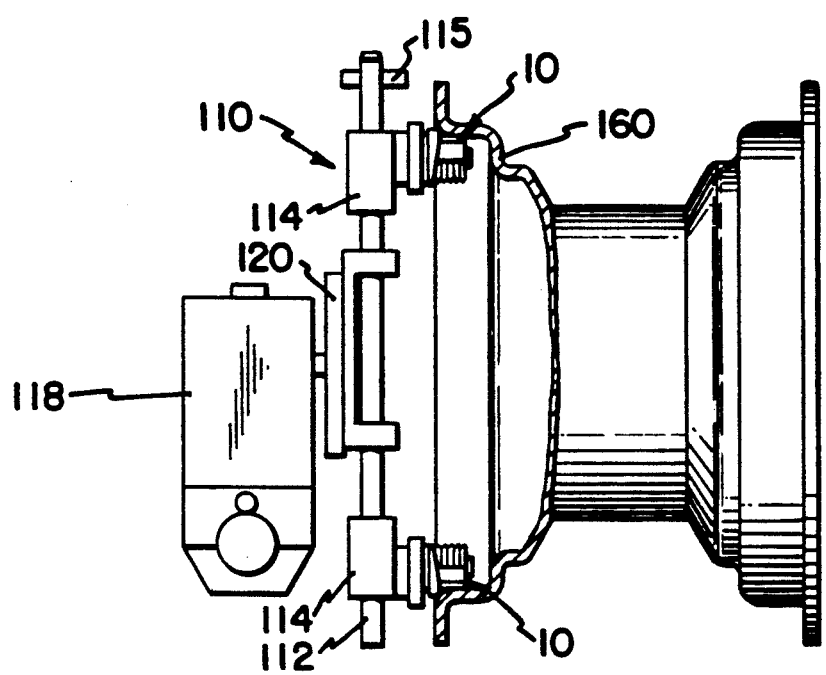
FIG_3
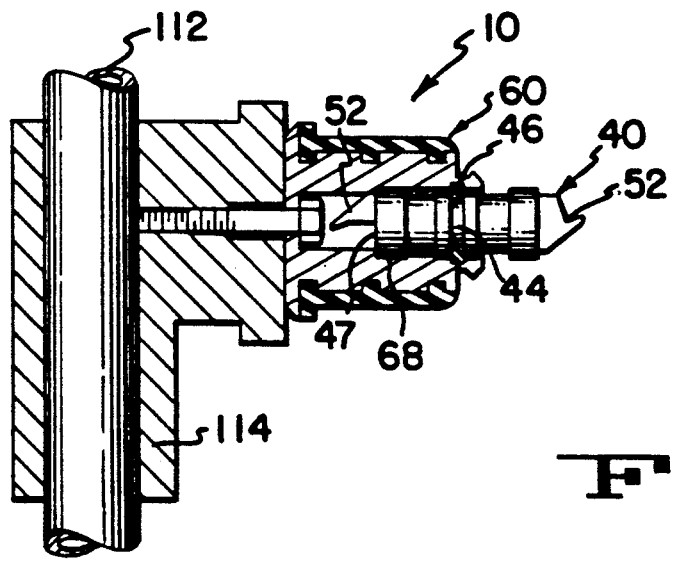
FIG_5
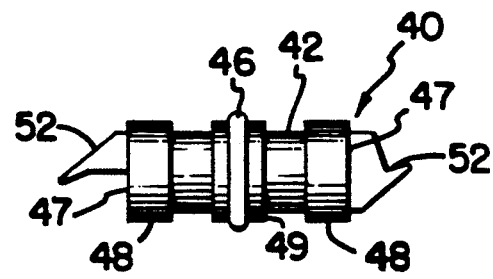
FIG_6

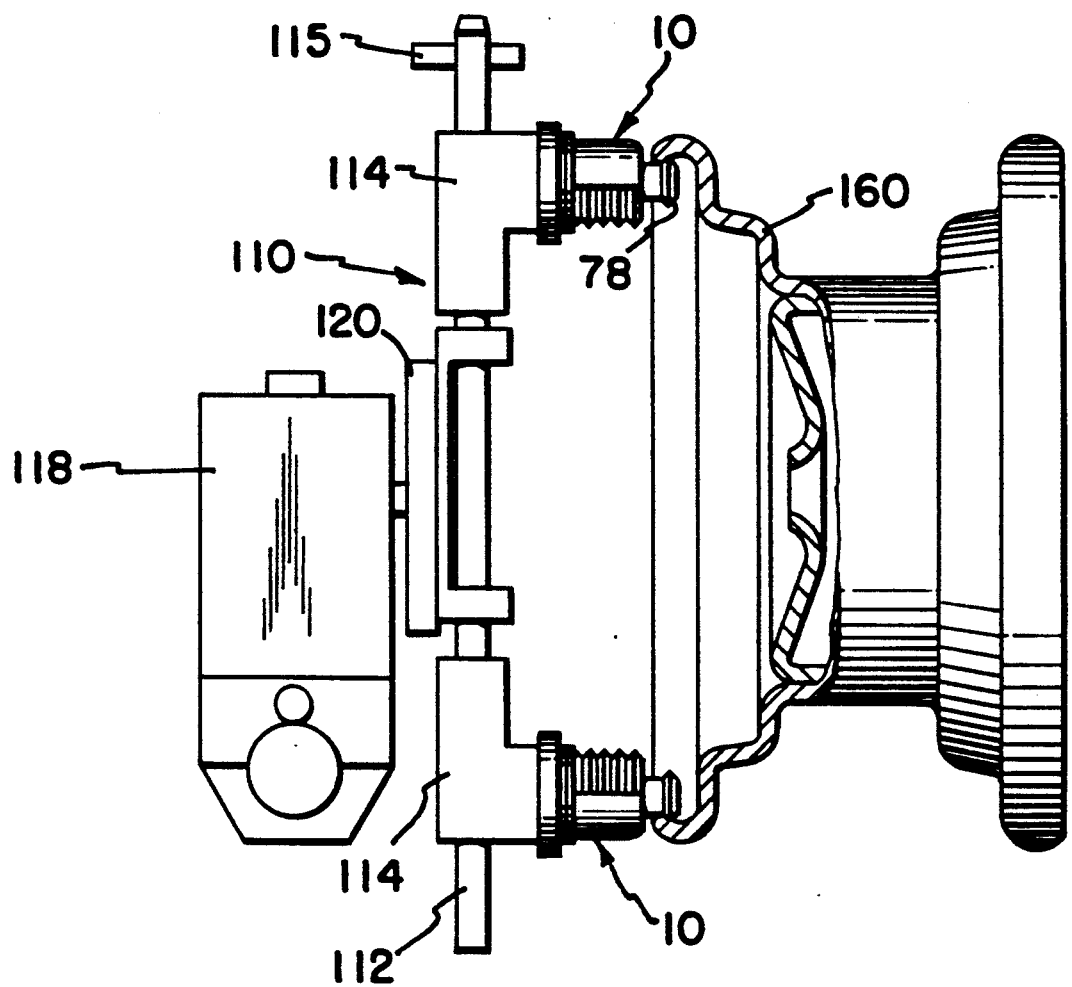
FIG_4

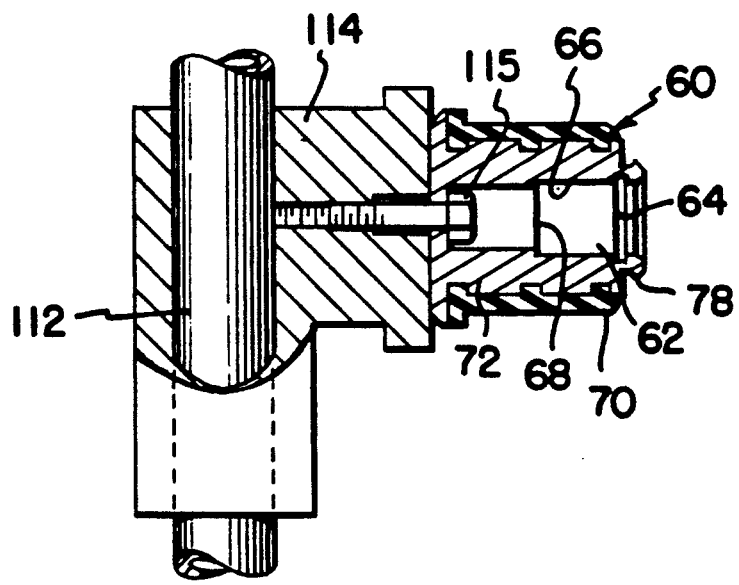
FIG_7
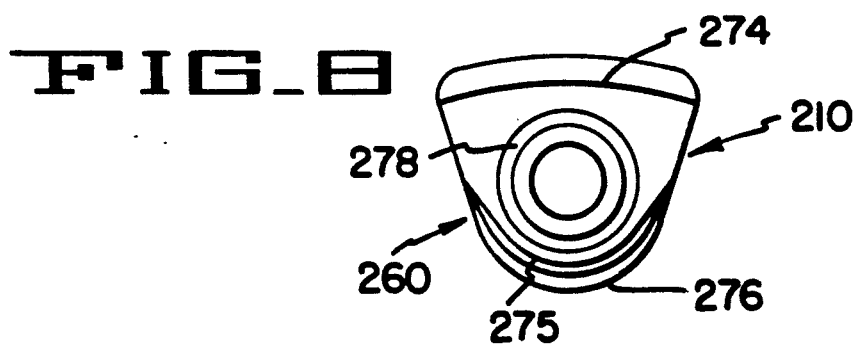
FIG_8
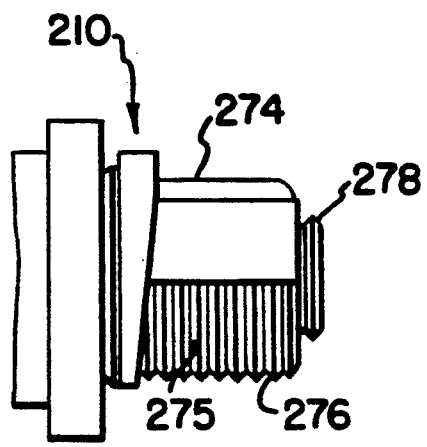
FIG_9

FIG_10
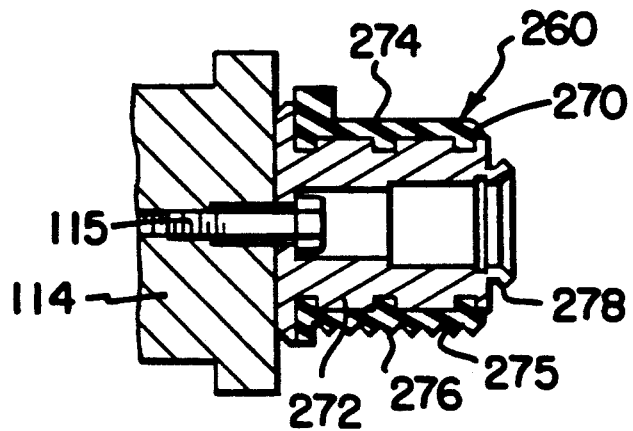
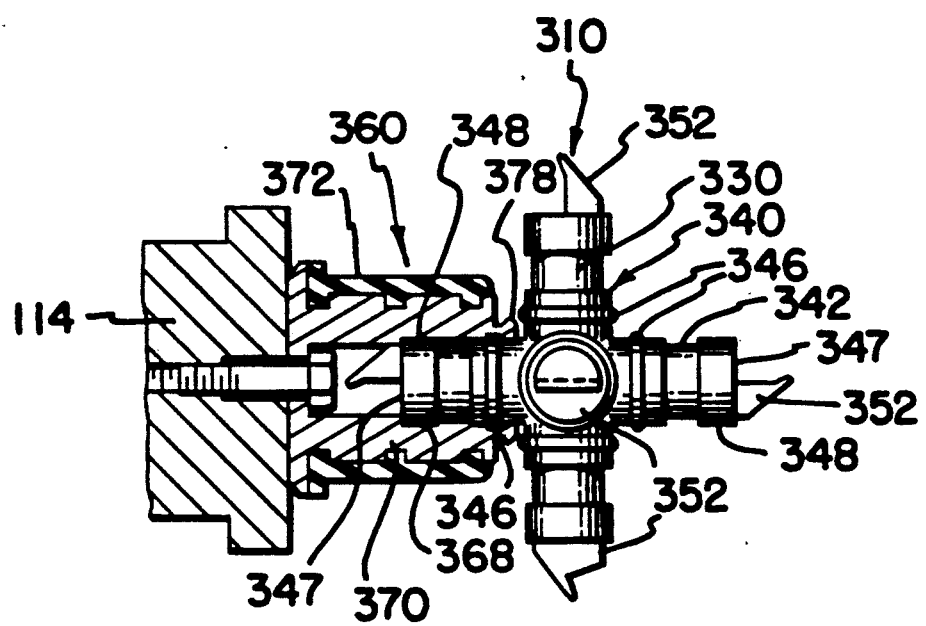
FIG_11

PLUG-IN WHEEL GRABBER

FIELD OF THE INVENTION

This invention relates to wheel clamps for releasably mounting the sensor devices of an automotive vehicle wheel alignment apparatus on the wheel of an automotive vehicle. More Particularly, the invention relates to grabbers of such clamps which clamp against the rim of an automotive vehicle wheel.

BACKGROUND OF THE INVENTION

Wheel clamps of the prior art generally include an array of three of more fingers which are maintained in clamped engagement with the exterior of a wheel rim by inward tensioning of the clamp or, alternatively. with the interior of a wheel rim by internal compressive force of the clamp assembly. Some rim engaging fingers of the prior art have been rotatable within a sleeve to orient a rim engagement portion of the finger as desired to clamp the exterior or interior of a wheel rim. Such a device is seen in U.S. Pat. No. 4,815,216, Swayne, assigned to the Assignee of the invention disclosed herein. The fingers may also include a base portion which may be provided with fallow grooves and may be placed in contact with the fallow of a wheel rim. The base portion may also have a knife edge to provide secure contact with certain wheel rim configurations. Some grabbers of the prior art have utilized finger plugs which may be unplugged from a base socket to facilitate placement of the grabber on the inside of certain rim configurations. Also, a grabber of the prior art has utilized a double ended finger plug in which one end of the plug is inserted through a base sleeve and the plug held in place in the sleeve by a pin, of the nature of a cotter pin, on the back side of the sleeve.

Grabbers of wheel clamps of the prior art suffer from a number of shortcomings. Only one or two finger end engagement surface profiles are available for engagement of the wheel rim. Grabbers with reversible finger plugs have required additional small parts to retain the fingers in the base sleeve. Also, only a single contour of the base has been available for the clamping on the surface of certain wheel rims.

SUMMARY OF THE INVENTION

It is an object of the present invention to provide a grabber for a wheel clamp of a wheel aligner which provides a large number of finger end rim engagement profiles.

It is a further object of the present invention to provide for quick and easy change of finger end profiles without requiring small, loose parts to be utilized to effect finger retention.

It is a further object of the present invention to provide for quick and easy removal or change of grabber fingers.

It is also an object of the present invention to provide a selection of base profiles for contacting the inside of wheel rims.

A wheel rim grabber for a wheel clamp of a wheel aligner is disclosed which includes a tip including a body shaft with a first wheel engagement end and a second wheel engagement end together with a barrel attached to a carrier of the wheel clamp and including engagement means for releasably engaging one of the wheel engagement ends within the barrel. The body of the shaft has a longitudinal axis extending from the first wheel engagement end to the second wheel engagement end and the tip further includes a cross shaft having first and second wheel engagement ends and a cross shaft axis extending from the first to the second cross shaft wheel engagement end. The cross shaft and body shaft axes are mutually perpendicular to one another.

A wheel rim grabber for a wheel clamp of a wheel aligner is disclosed which includes a tip including a body shaft with a first wheel engagement end and a second wheel engagement end together with a barrel attached to a carrier of the wheel clamp and including engagement means for releasably engaging one of the wheel engagement ends within the barrel. The barrel is cylindrical and is attached to the carrier at a base end, and extends away from the carrier along a cylinder axis to a distal end. Also included is a neoprene sleeve which surrounds the barrel.

A wheel rim grabber for a wheel clamp of a wheel aligner is disclosed which includes a tip including a body shaft with a first wheel engagement end and a second wheel engagement end together with a barrel attached to a carrier of the wheel clamp and including engagement means for releasably engaging one of the wheel engagement ends within the barrel. The barrel has a cylindrical axis which extends away from the carrier. The body shaft includes a shaft groove formed in a shaft wall wherein the shaft groove lies in a plane normal to a body shaft axis. The barrel surrounds a cylindrical bore which is shaped and sized to slidingly receive the body shaft and also has a bore groove formed in a bore wall. The bore groove lies in a plane normal to the bore axis. The releasable engagement means includes a resilient, elastic "O" ring which lies in the shaft groove such that, when an engagement end of the shaft is inserted in the cylindrical bore, the "O" ring resiliently urges the shaft groove and the bore groove toward alignment in a common plane.

A wheel rim grabber is disclosed herein for a wheel clamp in a wheel alignment system which includes an elongate removable rim grabbing member having a first rim engaging end and a second rim engaging end. Further, a barrel is included which is adapted to be secured to a carrier on the wheel clamp. The barrel has a bore therein for receiving the elongate rim grabbing member. Means is included for releasably securing the elongate rim grabbing member axially within the barrel bore. As a consequence the first and second rim engaging ends are selectively available for rim engagement and the rim grabbing member is rotatable about the axis of the barrel bore.

These and other advantages of the invention will become evident upon consideration of the following detailed description with reference to the drawings.

BRIEF DESCRIPTION OF THE DRAWINGS

FIG. 1 is a side elevation, in partial section, of a wheel clamp including wheel grabbers comprising an embodiment of the present invention mounted in compression inside a wheel rim.

FIG. 2 is a side elevation of a wheel clamp including wheel grabbers comprising an embodiment of the present invention clamped upon the exterior of a wheel rim.

FIG. 3 is a side elevation, in partial section of a wheel clamp including wheel grabbers comprising an embodiment of the present invention clamped on the inside of a wheel rim with an exterior surface of the barrel of the grabber in contact with the rim.

FIG. 4 is a side elevation, in partial section, of a wheel clamp including wheel grabbers comprising an embodiment of the present invention clamped on the inside of a wheel rim with a knife edge of the barrel of the grabber in contact with the rim.

FIG. 5 is a partial sectional view of a wheel grabber comprising a first embodiment of the present invention.

FIG. 6 is a side view of a tip of a wheel grabber comprising a first embodiment of the present invention.

FIG. 7 is a sectional view of the barrel of a wheel grabber comprising a first embodiment of the present invention.

FIG. 8 is an end view of a barrel of a wheel grabber comprising a second embodiment of the present invention.

FIG. 9 is a sectional view of a barrel portion of a wheel grabber comprising a second embodiment of the present invention.

FIG. 10 is a side view in partial section, of a barrel portion of a wheel grabber comprising a second embodiment of the present invention.

FIG. 11 is a partial sectional view of a wheel grabber comprising a third embodiment of the present invention.

DETAILS DESCRIPTION OF THE INVENTION

Wheel clamp 110 including wheel grabbers comprising an embodiment of the present invention is shown engaged with wheel rim 160 in FIGS. 1, 2, 3 and 4. Wheel clamp 110 includes posts 112 and carriers 114 which may be moved inwardly and outwardly along posts 112 and locked by tightening clamping knob 115 to clamp upon wheel rim 160. Alignment sensor head 118 is supported on sensor carrier 120.

Grabber 10 comprising an embodiment of the present invention is shown in detail in the partial sectional view of FIG. 5 and includes tip 40 and barrel 60. As may be seen in FIGS. 5 and 6, tip 40 includes shaft 42 and first and second wheel rim engagement ends 52. Ends 52 may be of different shape and proportion to facilitate grabbing of wheel rims of different geometry and size. As seen in FIG. 5, "O" ring 46, made of a resilient, elastic material, is retained about the center of shaft 42 of tip 40 by groove 44.

As may be seen in FIG. 7, barrel 60 has central bore 62 sized to slidingly receive ends 52 of body shaft 42 of tip 40, and is rigidly mounted on carrier 114 by bolt 116 passing through the base of barrel 60. Retention groove 64 is formed in wall 66 of bore 62. As seen in FIG. 5, when tip 40 is inserted in bore 62 of barrel 60, "O" ring 46 expands into retention groove 64 to resiliently retain tip 40 in engagement with barrel 60. In the preferred embodiment of FIG. 5 when expanded into retention groove 64, "O" ring 46 resiliently biases locating surface 47 of collar 48 against locating shoulder 68.

With tip 40 engaged by barrel 60 as shown in FIG. 5, engagement end 52 may be turned to engage the inside of a wheel rim, as illustrated in FIG. 1, or the outside of a wheel rim, as shown in FIG. 2. With tip 40 removed, barrel 60 may be utilized to clamp against an inner surface of a wheel rim by engaging the rim with soft outer shell 70, as shown in FIG. 3, or engaging the rim with knife edge 78, as shown in FIG. 4.

In the preferred embodiment of FIGS. 5 and 7, barrel 60 is provided with an outer soft shell 70 made of, for example, neoprene, surrounding hard inner core 72 made of, for example, a metallic material. This provides a soft clamping surface which may be utilized as illustrated in FIG. 3 to minimize the possibility of damaging decorative alloy-style wheels. In the embodiment of FIG. 7, in which barrel 60 is rigidly mounted on carrier 114, when an area of neoprene shell 70 becomes worn, bolt 116 may be loosened, barrel 60 rotated about its axis, and bolt 116 retightened to provide a new clamping surface for barrel 60.

A wheel grabber comprising an alternative embodiment of the present invention is shown in FIGS. 8, 9 and 10. As best seen in FIG. 8, barrel 260 of grabber 210 comprising the alternative embodiment has a noncircular cross section including surface 274 of a first radius of curvature and surface 276 of a smaller radius of curvature. In the alternative embodiment, outer soft shell 270 may be rotated about inner core 272 to place the desired surface in contact with a wheel rim, or, alternatively, core 272 may be rotatably mounted on carrier 114 by loosening and then tightening the bolts 116 to allow the entire barrel assembly 260 to be rotated.

Grabber 310 comprising a third embodiment of the present invention is shown in FIG. 11. In the embodiment of FIG. 11, tip 340 includes cross shafts 330 oriented with their axes normal to one another and to the axis of body shaft 342, and having wheel engagement ends 352. Tip 340 is retained in resilient engagement with barrel 360 by compressed "O" ring 346 which biases locating surface 347 of collar 348 against locating shoulder 368.

While exemplary grabbers comprising preferred embodiments of the present invention have been shown, it will be understood, of course, that the invention is not limited to these embodiments. Modifications may be made by those skilled in the art, particularly in view of the foregoing teachings. It is, therefore, contemplated that the appended claims cover any such modification which incorporate the inventive features of the present invention or which encompass the spirit and scope of the invention.

I claim:

1. A grabber for a wheel clamp of a wheel aligner comprising;
   a tip including a body shaft with a first wheel engagement end and a second wheel engagement end; and
   a barrel attached to a carrier of the wheel clamp and including engagement means for releasably engaging one of said wheel engagement ends within said barrel, said body shaft having a longitudinal axis extending from said first wheel engagement end to said second wheel engagement end and said tip further including a cross shaft having first and second wheel engagement ends and a cross shaft axis extending from said first to said second cross shaft wheel engagement end, said cross shaft and body shaft axes being mutually perpendicular to one another.

2. A grabber as in claim 1, in which said tip further includes a second cross shaft having first and second wheel engagement ends and a second cross shaft axis extending from said first to said second, second cross shaft wheel engagement end, said second cross shaft, cross shaft, and body shaft axes mutually perpendicular to one another.

3. A grabber as in claim 1 in which said barrel is cylindrical, attached to the carrier at a base end, and extends away from the carrier along a cylinder axis to a distal end.

4. A grabber as in claim 3, in which said barrel is circular in cross section.

5. A grabber as in claim 3, in which a cross section of said barrel is noncircular.

6. A grabber for a wheel clamp of a wheel aligner comprising;
   a tip including a body shaft with a first wheel engagement end and a second wheel engagement end; and
   a barrel attached to a carrier of the wheel clamp and including engagement means for releasably engaging one of said wheel engagement ends within said barrel, said barrel being cylindrical, attached to the carrier at a base end, and extending away from the carrier along a cylinder axis to a distal end, and further comprising a neoprene sleeve surrounding said barrel.

7. A grabber for a wheel clamp of a wheel aligner comprising:
   a tip including a body shaft with a first wheel engagement end and a second wheel engagement end; and
   a barrel attached to a carrier of the wheel clamp and including engagement means for releasably engaging one of said wheel engagement ends within said barrel, said barrel having a cylindrical axis extending away from the carrier, said body shaft including a shaft groove formed in a shaft wall, said shaft groove lying in a plane normal to a body shaft axis and wherein said barrel surrounds a cylindrical bore shaped and sized to slidingly receive said body shaft and having a bore groove formed in a bore wall, said bore groove lying in a plane normal to a bore axis, said releasable engagement means comprising a resilient, elastic "O" ring lying in said shaft groove such that, when an engagement end of said shaft is inserted in said cylindrical bore, said "O" ring resiliently urges said shaft groove and said bore groove toward alignment in a common plane.

8. A grabber as in claim 7 in which a shoulder is formed in said bore wall and each of said engagement ends includes a collar such that when the engagement end is inserted in said bore said "O" ring resiliently urges said collar against said shoulder.

9. A wheel rim grabber for a wheel clamp in a wheel alignment system, comprising
   an elongate removable rim grabbing member having a first rim engaging end and an opposite second rim engaging end,
   a barrel adapted to be secured to a carrier on the wheel clamp, said barrel having a barrel bore therein for alternately receiving one of sad first and second rim engaging ends, and
   means for releasably securing said one of said first and second elongate rim engaging ends axially within said barrel bore, whereby one of said first and second rim engaging ends is selectively extending from said barrel bore and available for rim engagement and said rim grabbing member is rotatable about the axis of said barrel bore.

10. A wheel rim grabber as in claim 9 wherein said rim grabbing member has a groove formed around the outer surface thereof, and said barrel bore has a groove formed in the wall thereof, said means for releasably securing comprising a resilient ring lying within said rim grabbing member groove and in engagement with said barrel bore groove.

11. A wheel rim grabber as in claim 9 comprising a soft outer shell surrounding said barrel.

12. A wheel rim grabber as in claim 11 wherein said barrel has an outside surface and wherein said outside surface comprises a non-circular cross section.

13. A wheel rim grabber as in claim 9 comprising
   a shoulder inside said barrel bore, and wherein said elongate removable rim grabbing member comprises
   first and second collars spaced from said first and second rim engaging ends respectively, one of said first and second collars being urged against said shoulder by said means for releasably securing when said elongate rim grabbing member is inserted in said barrel bore thereby locating said rim grabbing member in said bore.

* * * * *